United States Patent [19]

Takagi et al.

[11] 4,180,273
[45] Dec. 25, 1979

[54] SEALING DEVICE FOR ROTOR SHAFT OF FLUID MACHINE

[75] Inventors: Nobuho Takagi; Muneo Maegawa; Katsutoshi Nii, all of Hitachi, Japan

[73] Assignee: Hitachi, Ltd., Tokyo, Japan

[21] Appl. No.: 948,549

[22] Filed: Oct. 4, 1978

[30] Foreign Application Priority Data

Oct. 7, 1977 [JP] Japan .............................. 52-119918

[51] Int. Cl.² .......................... F16J 9/08; F16J 15/24
[52] U.S. Cl. .................................... 277/154; 277/27; 277/157; 277/193
[58] Field of Search .................... 277/3, 27, 192, 193, 277/195, 199, 154, 157, 163

[56] References Cited

U.S. PATENT DOCUMENTS

| | | | |
|---|---|---|---|
| 1,309,075 | 7/1919 | Morris | 277/157 X |
| 1,327,801 | 1/1920 | Blache | 277/154 |
| 1,426,694 | 8/1922 | Weidenfeller | 277/193 |
| 3,305,241 | 2/1967 | Hart | 277/199 X |
| 3,844,572 | 10/1974 | Parker | 277/27 |
| 3,893,675 | 7/1975 | Geffroy | 277/195 X |
| 4,005,953 | 2/1977 | Ruf | 277/193 X |

FOREIGN PATENT DOCUMENTS 53-3021 2/1978 Japan .............................. 277/192

*Primary Examiner*—Robert S. Ward, Jr.
*Attorney, Agent, or Firm*—Thomas E. Beall, Jr.

[57] ABSTRACT

A sealing device for rotor shaft of fluid machine. The sealing device has a solid annular packing extending circumferentially around the rotor shaft and including a plurality of circumferentially spaced segments. Each segment has a radially inner surface which functions as the sliding surface which is in sliding contact with the surface of the rotor shaft. The sliding surface is inclined from its edge adjacent to the low pressure side of the fluid machine radially outwardly, so that the sliding surface makes the initial sliding contact with the rotor shaft surface only at its edge adjacent to the low pressure side.

16 Claims, 11 Drawing Figures

SEALING DEVICE FOR ROTOR SHAFT OF FLUID MACHINE

BACKGROUND OF THE INVENTION

1. FIELD OF THE INVENTION

The present invention relates to a sealing device for the rotor shaft of a fluid machine and, more particularly, to a sealing device provided with a solid packing extending circumferentially around the rotor shaft, the solid packing having a plurality of circumferentially spaced segments.

2. DESCRIPTION OF THE PRIOR ART

The sealing device conventionally used for the rotor shaft of a fluid machine has at least one solid packing extending circumferentially around the rotor shaft and disposed in a single stage or a plurality of stages in the axial direction of the rotor shaft. Each solid packing includes a plurality of circumferentially spaced segments with a suitable gap left between adjacent ones. These segments are accomodated and supported by an annular sealing box.

In operation of the fluid machine, the sealing box is distorted and angularly displaced by the action of the fluid at the high-pressure side of the sealing box. The distortion and the angular displacement of the sealing box in turn causes an angular displacement of the segments in the sealing box. At the same time, the segments themselves are angularly displaced due to the action of the fluid at the high pressure side. More specifically, each segment is made to incline such that the sliding surface thereof contacts the rotor shaft surface only at its edge adjacent to the high pressure side, while the edge of the same adjacent to the low pressure side is spaced away from the shaft surface. Consequently, the sliding surface in the inclined state defines, in cooperation with the rotor shaft surface, a wedge-shaped space in cross-section which opens at its low-pressure side end and closes at its high-pressure side end. Since the wedge-shaped space inconveniently allows the fluid to pass therethrough, the flow rate of the cooling fluid, which is intentionally made to pass through the gaps between the adjacent segments to cool them down, is increased impractically, so that the sealing performance of the sealing device is deteriorated considerably.

The deterioration of the sealing effect is more serious if each segment has a circumferential groove formed in the sliding surface and a fluid passage for introducing the fluid from the high pressure side into the groove for cooling the segment and for decreasing the surface pressure on the sliding surface, because the fluid will leak from the high pressure side through the fluid passage and the groove to the low pressure side, in addition to the above discussed leakage.

In addition, in the conventional sealing device of the kind described, the initial sliding contact between the rotor shaft surface and the segment is made only at the edge of the latter adjacent to the high pressure side. Thus, it takes a considerably long time until this edge is worn down to provide a contact area large enough to ensure the required sealing effect.

SUMMARY OF THE INVENTION

It is therefore an object of the invention to provide a sealing device for the rotor shaft of a fluid machine, in which the leakage of the fluid from the high pressure side to the low pressure side, attributable to the angular displacement of the segment of solid packing caused by the fluid of the high pressure side, is minimized.

To this end, according to the invention, there is provided a sealing device for the rotor shaft of a fluid machine, comprising an annular sealing box extending circumferentially around the rotor shaft, and a ring-shaped solid packing received in and supported by the sealing box, the solid packing including a plurality of circumferentially spaced segments, wherein each of the segments comprises:

two opposing surfaces spaced axially of the rotor shaft, one of the surfaces being disposed adjacent to the low pressure side of the fluid machine, while the other is disposed adjacent to the high pressure side of the fluid machine;

side surfaces spaced circumferentially of the rotor shaft; and a sliding surface defined by radially inner edges of the opposing surfaces and by radially inner edges of the side surfaces and adapted to be kept in a sliding contact with the surface of the rotor shaft, the sliding surface having two axial half regions, one of the two regions being closer to the low pressure side and the other being closer to the high pressure side;

at least an axial portion of the one axial half region, extending between the side surfaces, being adapted to make an initial sliding contact with the rotor shaft.

DESCRIPTION OF THE PREFERRED EMBODIMENT

DETAILED DESCRIPTION OF PRIOR ARTS (FIGS. 1 thru 5)

Before turning to the description of the preferred embodiment of the present invention, an explanation will be made as to the problem involved in the prior art, i.e. the technical problems to be overcome by the invention, with specific reference to FIGS. 1 to 5. This explanation will be of some help, we hope, in understanding the advantages of the invention.

Figure 1:
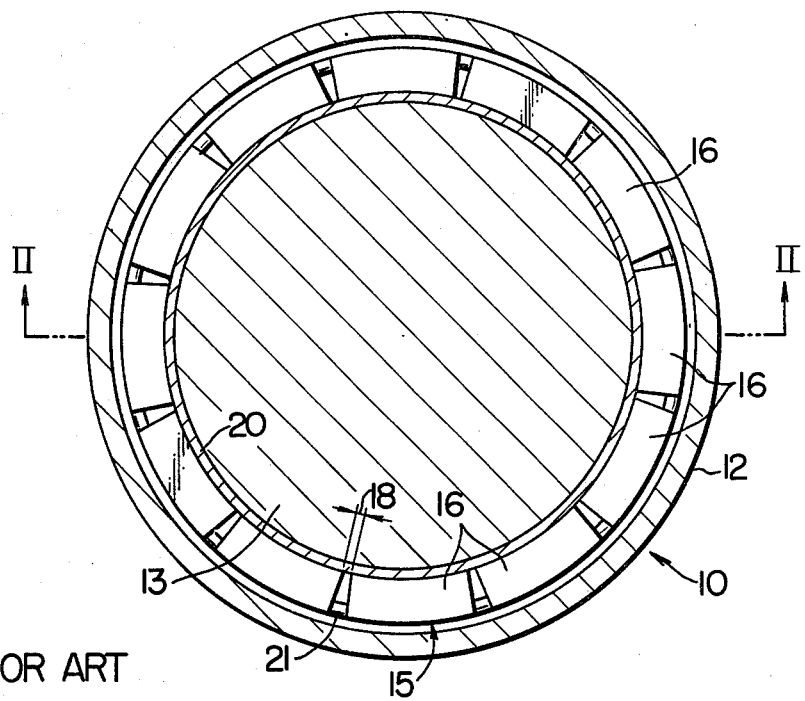
FIG. 1 is a sectional plan view of a conventional sealing device of a fluid machine, taken along the line I—I of FIG. 2, in the state in which no fluid pressure is applied to the sealing device.
Figure 2:
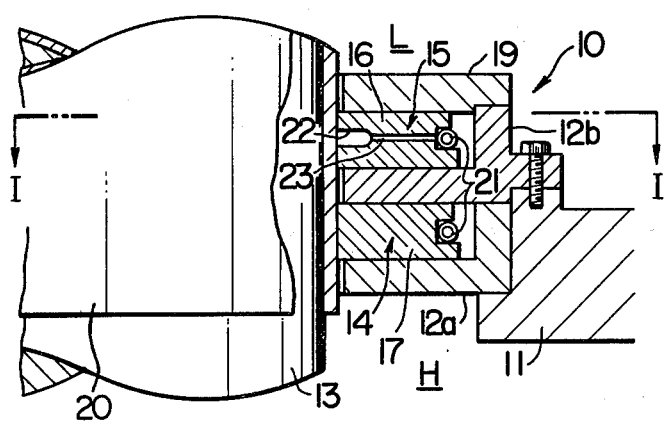
FIG. 2 is a sectional view taken along the line II—II of FIG. 1.

Typical conventional sealing device for the rotor shaft of a fluid machine has a construction as shown in FIGS. 1 and 2. The sealing device, generally designated at a reference numeral 10 in FIGS. 1, 2, includes annular sealing boxes 12a, 12b attached to a cover 11 by bolts or the like means and extending circumferentially around the rotor shaft 13 of the fluid machine. These sealing boxes receive solid packings 14, 15, respectively. Each solid packing includes a plurality of circumerentially spaced segments 16, 17. In each solid packing, the segments 16 (or 17) are disposed circumferentially with a suitable gap 18 defined between adjacent ones. The arrangement is such that a certain amount of fluid is passed through the gaps 18, from the high-pressure side H to the low-pressure side L of the fluid machine to cool the segments 16 (or 17).

The sealing device 10 further has an annular cover 19 for retaining the uppermost solid packing 15 in the sealing box 12, and annular springs 21 adapted to resiliently bias the segments 16, 17 radially inwardly into contact with the surface of the rotor shaft 13. These springs 21 are received by circumferential grooves formed in the radially outer surfaces of the segments 16, 17.

The segment 16 may be provided in its sliding surface with at least one circumferential groove 22, and a passage 23 for introducing the fluid from the high pressure side into the groove 22, so that the segment 16 may be effectively cooled down by the fluid flowing through the passage 23 and the groove 22 and that the pressure on the sliding surface may be reduced.

Figure 4:
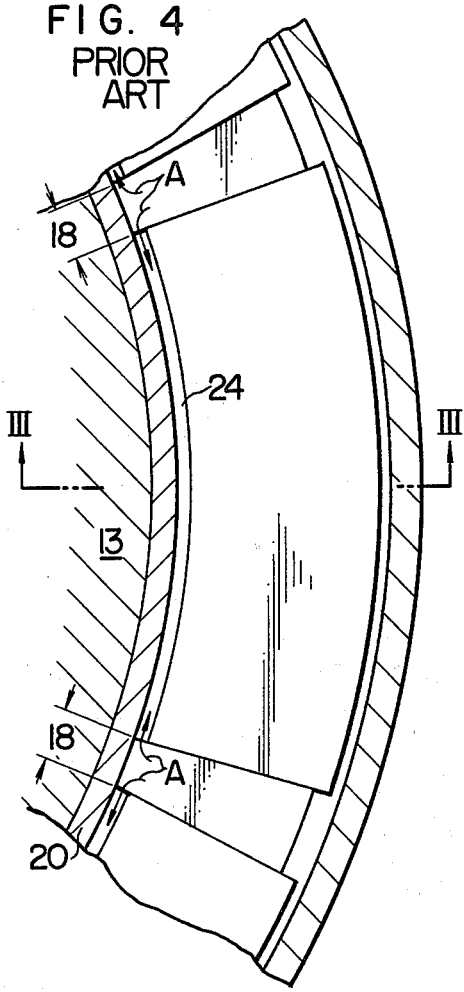
FIG. 4 is a sectional view taken along the line IV—IV of FIG. 3.
Figure 3:
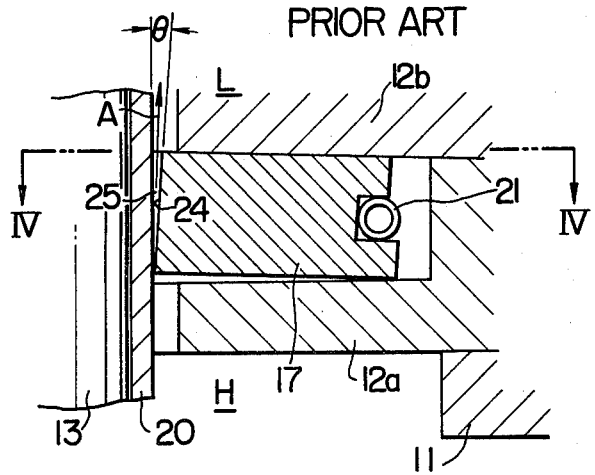
FIG. 3 is an enlarged sectional view of a portion of the sealing device as shwon in FIGS. 1 and 2, taken along the line III—III of FIG. 4, in the state in which a fluid pressure is applied to the sealing device to angularly displace the segment.
Figure 5:
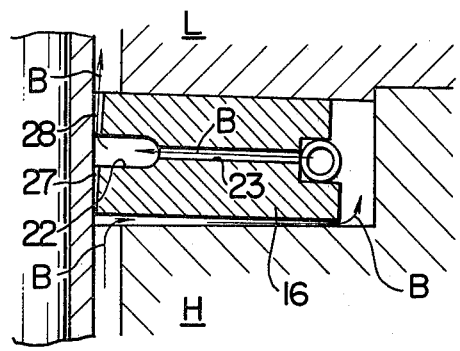
FIG. 5 is an enlarged sectional view of the sealing device as shown in FIGS. 1 and 2, in the state in which the segment having a circumferential groove is angularly displaced by the fluid pressure acting on the sealing device.

In the conventional sealing device having the described construction, the segments 16, 17 of the device are angularly displaced as shown in FIGS. 3 to 5, as the fluid at the high pressure side H acts on the sealing device. More specifically, the fluid at the high pressure side H of the fluid machine, acting on the sealing device 10, tends to distort the cover 11 and the sealing boxes 12a, 12b such that their radially inner edges are urged toward the low pressure side. At the same time, the same fluid causes an angular displacement of the cover 11 and the sealing boxes 12a, 12b around their fixing point, toward the low pressure side.

Further, the fluid pressure acting on the sealing device acts also on the segments 17 themselves, to cause such an angular displacement of the segments that the radially inner ends of these segments 17 are moved toward the low pressure side. Consequently, each segment 17 is displaced angularly by an angle $\theta$ which is a composite or resultant angle of the distortion and angular displacement of the cover 11 and the sealing boxes 12a, 12b and the angular displacement of the segment itself. Thus, the sliding surface of the segment 17 is angularly moved such that its edge adjacent to the high pressure side H is kept in contact with the surface of the rotor shaft, while the edge adjacent to the low pressure side is moved away from the rotor shaft surface, so as to define, in cooperation with the surface of the rotor shaft, a wedge-shaped space 25 in cross-section which closes at the high pressure side and opens at the low pressure side. As a result, the fluid, which is intentionally made to flow through the gaps 18 between adjacent segments 17, is allowed to flow through the wedge cross-sectioned spaces 25, via the circumferential ends thereof, as shown by arrows A. Consequently, the flow rate of the fluid for the cooling purpose, i.e. the leakage from the high pressure side to the low pressure side, is inconveniently increased to deteriorate the sealing performance of the sealing device.

In case where each segment is provided with a circumferential groove 22 formed in its sliding surface, and a passage 23 for introducing the fluid from the high pressure side H into the circumferential groove 22, for the purposes of cooling down the segment 16 and reducing the pressure on the sliding surface, as shown in FIG. 5, the fluid is allowed to flow, in addition to the leakage as explained in relation with FIGS. 3 and 4, through the passage 23, circumferential groove 22, and then through the wedge cross-sectioned space 28 defined by the sliding surface 27 and the outer surface of the liner 20, as shown by arrows B. Consequently, the sealing effect is further deteriorated.

In addition, it is to be pointed out that, in the conventional arrangement as shown in FIGS. 3 to 5, the initial sliding contact of the sliding surfaces 24, 27 with the liner 20 is made at the edges of these sliding surfaces adjacent to the high pressure side H. It takes a long time until these initially contacting edges are worn down to present sufficiently large contacting areas to ensure the satisfactory sealing of the fluid.

DESCRIPTION OF THE PREFERRED EMBODIMENTS (FIGS. 6 thru 11)

Hereinafter, preferred embodiments of the present invention will be described with reference to FIGS. 6 to 11. In these Figures, the same reference numerals are used to denote same parts or members as those of the conventional device as shown in FIGS. 1 to 5.

Figure 6:
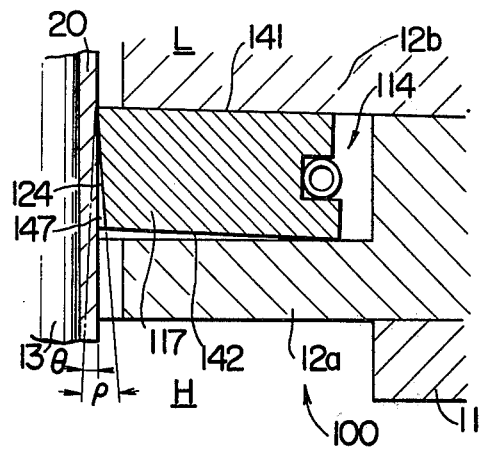
FIG. 6 is an enlarged sectional view of an essential part of a sealing device in accordance with the invention.

FIG. 6 shows a first embodiment of the invention. The sealing device generally designated at a reference numeral 100 has an annular sealing box 12a fixed to a cover 11 by bolts or the like fastening means and extending circumferentially around the rotor shaft 13 of the fluid machine, an annular solid packing 114 received in the sealing box 12a, and an annular cover or another sealing box 12b for retaining the solid packing in the sealing box 12a. The annular solid packing 114 has a plurality of circumferentially spaced segments 117. A gap is defined between the adjacent segments 117, so that the fluid may flow from the high pressure side H to the low pressure side L through these gaps to effectively cool down the segments 117. A circumferential groove is formed in the radially outer end surface of each segment 117. A spring 21 is received by the circumferential groove to bias all segments radially inwardly, thereby to ensure the safe contact of the segment with the liner surface.

Figure 7:
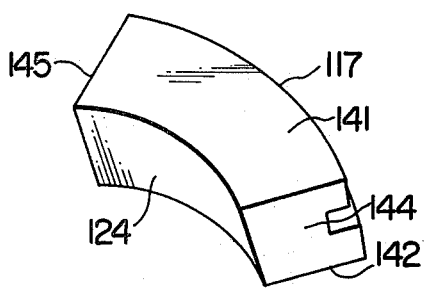
FIG. 7 is a perspective view of a segment incorporated in the sealing device as shown in FIG. 6.

As will be seen from FIG. 7, the segment 117 has two opposing surfaces 141, 142 spaced axially of the rotor shaft 13. One (141) of these opposing surfaces is located adjacent to the low pressure side L, while the other (142) is located adjacent to the high pressure side H. The segment 117 further has side surfaces 144, 145 spaced circumferentially of the rotor shaft 13, and a sliding surface 124 defined by the radially inner edges of the opposing surfaces 141, 142 and the radially inner edges of the side surfaces 144, 145.

As has been stated in relation with FIG. 3, the cover 11 and the sealing box 12a are distorted and angularly displaced by the action of the fluid at the high pressure side H, so as to angularly displace the segments. Further, the segments themselves are angularly displaced by the fluid at the high pressure side acting thereon. Consequently, the segments are angularly displaced by an angle $\theta$ which is a compound or resultant angle of the distortion and angular displacement of the cover and sealing box, and the angular displacement of the segments themselves. This angle $\theta$ can be known through a calculation and/or experiments.

The sliding surface 124 of each segment 117 in the sealing device 100 as shown in FIG. 6 is inclined from one surface 141 of the segment, radially outwardly by an angle $\rho$ which is at least equal to the angle $\theta$. Therefore, the sliding surface 124 makes the initial sliding contact with the liner 20 of the rotor shaft 13, only at the portion thereof adjacent to the one surface 141, i.e. at the radially inner edge 141 of the one surface 141, irrespective of whether the fluid at the high pressure side is acting or not.

Thus, the sliding surface 124 makes the initial sliding contact with the rotor shaft 13 at its portion adjacent to the surface 141 which is closer to the low pressure side, and, due to its inclination, cooperates with the outer surface of the liner 20 in defining therebetween a wedge-shaped space 147 in cross-section which opens at the high-pressure side and closes at the low-pressure side. Since the wedge shaped space 147 is closed at the low pressure side L, the high pressure fluid introduced into the wedge-shaped space 147 is not allowed to flow into the low pressure side L, so that the leakage observed in the conventional device as explained in relation with FIG. 3 is fairly avoided.

Figure 8:
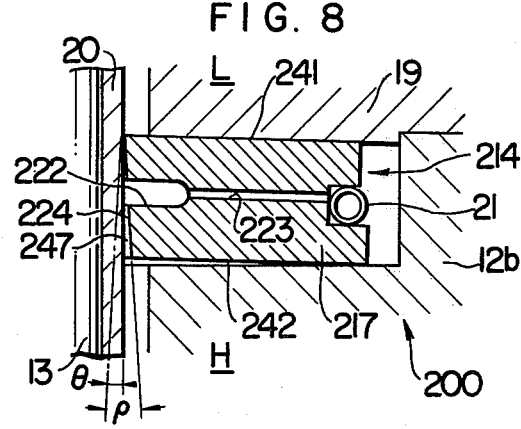
FIG. 8 is an enlarged sectional view of an essential part of a sealing device which is another embodiment of the invention.
Figure 9:
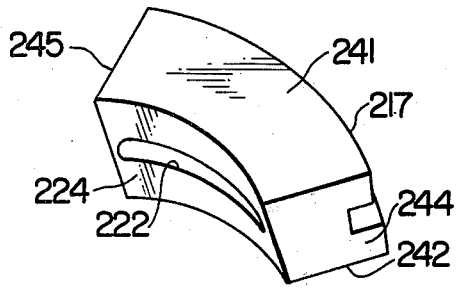
FIG. 9 is a perspective view of a segment incorporated in the sealing device as shown in FIG. 8.

Referring now to FIGS. 8 and 9 showing a second embodiment of the invention, the sealing device generally designated at a reference numeral 200 has a sealing box 12b fixed to the cover by bolts or the like fastening means, an annular solid packing 214 received in the sealing box 12b, and an annular cover 19 or another sealing box by which the solid packing is retained in the sealing box 12b. The solid packing 214 has a plurality of circumferentially spaced segments 217. A gap is defined between adjacent segments. A certain rate of fluid flow is allowed to pass through the gaps from the high pressure side H to the low pressure side L to cool the segments 217 down.

A circumferential groove is formed in the radially outer end surface of each segment. The segments are biased radially inwardly by a spring 21 received in the circumferential groove, into contact with the rotor shaft 13 through the medium of the liner 20.

As will be seen from FIG. 9, each segment 217 has two opposing surfaces 241, 242 spaced axially of the rotor shaft 13. One (241) of these surfaces is located adjacent to the low pressure side L, while the other (242) is located adjacent to the high pressure side H. Each segment further has side surfaces 244, 245 spaced circumferentially of the rotor shaft 13, and a sliding surface 224 defined by the radially inner edges of the opposing surfaces 241, 242 and the radially inner edges of the side surfaces 244, 245. The sliding surface 244 has at least one circumferential groove 222 formed therein.

The segment 217 further has a passage 223 adapted to introduce the fluid from the high pressure side H into the groove 222, so that the segment may effectively be cooled by the fluid.

The sliding surface 244 of the sealing device 200 as shown in FIGS. 8 and 9 is inclined from one surface 241 of the segment radially outwardly, by an angle $\rho$ which is at least equal to the aforementioned angle $\theta$ of angular displacement of the segment. Therefore, the sliding surface 224 makes the initial sliding contact with the liner 20 of the rotor shaft 13 only at its portion adjacent to one surface 241 of the segment, i.e. only at the radially inner edge of the one surface 241, irrespective of whether the fluid of the high pressure side H is acting on the sealing device 200 or not.

Thus, the sliding surface 224, which makes the initial sliding contact with the liner 20 at its portion adjacent to the one surface 241 closer to the lower pressure side L, defines in cooperation with the outer surface of the liner 20 a wedge-shaped space 247 in cross-section which opens at the high-pressure side and closes at the low-pressure side. Since this wedge-shaped space 247 is closed at the low-pressure side L, the flow of fluid directly introduced into the space 247 and the flow of fluid introduced into the circumferential groove 222 through the passage 223, are prevented from flowing out to the low pressure side L, so that the problem in the conventional sealing device explained previously in relation with FIG. 5 is fairly avoided.

Figure 10:
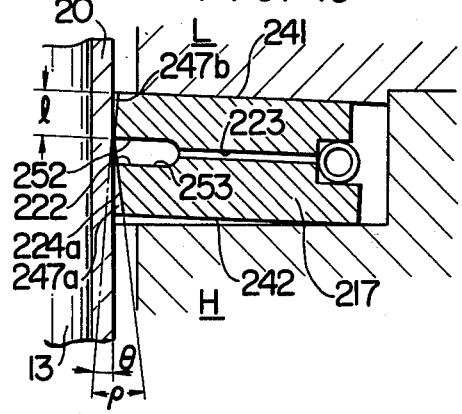
FIG. 10 is an enlarged sectional view of an essential part of a modification of the sealing device as shown in FIGS. 8 and 9.

FIG. 10 shows a modification of the second embodiment as shown in FIGS. 8 and 9.

Referring to FIG. 10, the circumferential groove 222, which is formed in the sliding surface 224a defined by the radially inner edges of the opposing surfaces 241, 242 and the radially inner edges of the circumferential side surfaces, has two side walls 252, 253 spaced axially of the rotor shaft 13. One (252) of the side walls is disposed adjacent to the low pressure side L, while the other (253) is disposed adjacent to the high pressure side H of the fluid machine. An axial portion of the sliding surface 224a extending from one side wall 252 of the circumferential groove 222 to and the other surface 242 of the segment 217 is inclined radially outwardly, with respect to the remaining portion of the sliding surface 224a, i.e. with respect to the portion of the sliding surface 224a extending between the one side wall 252 of the groove 222 and the one (241) of the opposing surfaces of the segment, by an angle $\rho$ which is at least equal to the aforementioned angle $\theta$ by which said segment is angularly displaced. Consequently, when the segment is angularly displaced by the angle $\theta$ by the fluid at the high pressure side H, the sliding surface 224a makes the initial sliding contact with the liner 20 of the rotor shaft 13, only at its portion adjacent to the one side wall 252 of the circumferential groove 222, i.e. at the radially inner edge of the one side wall 252. Thus, the initial sliding contact with the liner 20 of the rotor shaft 13 is performed by the portion of the sliding surface 224a adjacent to the side wall 252 of the circumferential groove 222 adjacent to the low pressure side L, and the inclined portion of the sliding surface 224a extending between the one side wall 252 and the other (242) of the opposing surfaces of the segment, in cooperation with the outer surface of the liner 20, forms a wedge-shaped spaced 247a in cross-section which opens at the high-pressure side and closes at the low-pressure side. Since this wedge-shaped space 247a is closed at the low-pressure side, the flow of fluid directly introduced into this space 247a and the flow of fluid introduced into the circumferential groove 222 through the passage 223 are prevented from flowing out to the low pressure side L.

In the arrangement as shown in FIG. 10, the portion of the sliding surface 224a extending between the one side wall 252 of the circumferential groove 222 and the one (241) of the opposing surfaces of the segment defines, in cooperation with the outer surface of the sleeve 20, a second wedge-shaped space 247b in cross-section which opens at the low-pressure side and closes at the high-pressure side. The fluid from the high pressure side H flows through the gaps between the segments and then through the circumferential open ends of the second wedge-shaped space 247b, and flows out to the low pressure side L through the axial open end of the second wedge-shaped space 247b adjacent to the low pressure side L. This flow of the fluid through the second wedge-shaped space 247b is however negligibly small.

Figure 11:
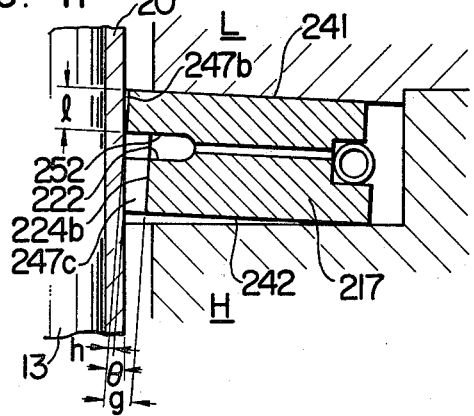
FIG. 11 is an enlarged sectional view of an essential part of another modification of the sealing device as shown in FIGS. 8 and 9.

Referring now to FIG. 11 which shows another modification of the sealing device as shown in FIGS. 8 and 9, the portion of the sliding surface 224b extending between the one side wall 252 of the circumferential groove 222 and the other (242) of the opposing surfaces of the segment is retracted radially outwardly by a distance g from the remaining portion of the sliding surface extending between the one side wall 252 of the circumferential groove 222 and the one (241) of the opposing surfaces of the segment. The distance g is at least equal to the length of the cord h of an arc over which the radially inner edge of the other surface (242) of the segment is moved as the segment is angularly displaced by the angle $\theta$.

Therefore, when the segment 217 is angularly displaced by the angle $\theta$ by the fluid at the high pressure side H acting on the sealing device, the initial sliding contact of the sliding surface with the outer surface of the liner 20 is made only at the portion of the sliding surface adjacent to the one side wall 252 of the circumferential groove 222, i.e. only at the radially inner edge of one side wall 252 of the circumferential groove 222. Thus, the initial sliding contact with the liner 20 is performed by the portion of the sliding surface adjacent to one side wall 252 of the circumferential groove 222 closer to the low pressure side L, and the retracted portion of the sliding surface 224b extending from the one side wall 222 to of the circumferential groove 252 and the other surface 242 of the opposing surfaces of the segment defines, in cooperation with the outer surface of the liner 20, a generally rectangular cross-sectioned space 247c which opens at the high-pressure side and closes at the low-pressure side.

The operations of the modifications as shown in FIGS. 10 and 11 are materially identical to that as described with respect to FIGS. 8 and 9 and, therefore, are not detailed here.

As explained previously in relation with FIG. 10, the flow rate of the fluid passing through the second wedge-shaped space 247b of FIG. 11, which is defined by the outer surface of the liner 20 and the portion of the sliding surface extending between the one side wall 252 of circumferential groove 222 and one (241) of the opposing surfaces of the segment 217 is negligibly small. This is because the axial length l of the second wedge cross-sectioned space 247b is small, and the circumferential open ends of the space 247b have small areas to exhibit a large resistance to the flow of fluid coming into the circumferential open ends of the space 247b.

From the above explanation, it will be understood that it is not essential in the sealing devices as shown in FIGS. 6 to 9 that the portion of the sliding surface 124 (224) of the segment 117 (217) adjacent to the one surface 141 (241) of opposing surfaces of the segment makes the initial sliding contact with the outer surface of the liner 20. An experiment showed that a satisfactory result is obtainable when at least an axial portion of the axial half region of the sliding surface 124 (224) adjacent to the low pressure side L makes the initial sliding contact with the outer surface of the liner 20.

In FIGS. 10 and 11, the segment is shown to have only one circumferential groove formed in the sliding surface. However, this is not exclusive, and the segment can have more than two circumferential grooves axially spaced in its sliding surface. When the segment is provided with more than two circumferential grooves, the portion of the sliding surface, extending between the side wall adjacent to the low pressure side of the circumferential groove closest to the low pressure side, and the other surface of opposing surfaces of the segment adjacent to the high pressure side, is inclined or retracted radially outwardly with respect to the remaining portion of the sliding surface.

In the sealing device of the invention having the described construction, the initial sliding contact is made in the form of a linear contact, so that the wear of the sliding surface at the initial stage or running-in period proceeds promptly to gradually increase the area of the sliding contact. Consequently, a satisfactory sealing performance is attained by an ordinary running-in operation. For this reason, the solid packing is preferably made of carbon or a plastic which exhibits a large rate of wear.

The advantage brought about by the sealing device is more remarkable when it is adopted in a fluid machine having a large pressure differential between the high pressure and low pressure sides. For this reason, the sealing device of the invention is suitably used in association with the rotor shaft of a hydraulic machine, particularly a water wheel having a large capacity and adapted to be driven under a large head.

As has been described, according to the invention, at least an axial portion of the axial half region of the sliding surface adjacent to the low pressure side of the fluid machine is made to perform the initial sliding contact with the outer surface of the rotor shaft. Therefore, the leakage of the fluid attributable to the angular displacement of the segment caused by the fluid at the high pressure side is minimized, even when such an angular displacement is caused. Further, the required sealing effect is obtainable from the beginning of the use of the solid packing and, at the same time, a sufficient fluid seal can be attained in quite a short period of running-in.

What we claim is:

1. A sealing device for the rotor shaft of a fluid machine, comprising an annular sealing box extending circumferentially around said rotor shaft, and an annular solid packing received in and supported by the sealing box, said solid packing including a plurality of circumferentially spaced segments, wherein each of said segments comprises:

two opposing surfaces spaced axially of said rotor, one of said surfaces being disposed adjacent to the low pressure side of said fluid machine, while the other is disposed adjacent to the high pressure side of said fluid machine;

side surfaces spaced circumferentially of said rotor shaft; and a sliding surface defined by radially inner edges of said opposing surfaces and said side surfaces and adapted to be kept in a sliding contact with the surface of said rotor shaft, said sliding surface having two axial half regions, one of said two axial half regions being adjacent to said one of said opposing surfaces and the other axial half region being adjacent to said the other of said opposing surfaces;

at least an axial portion of said one axial half region, extending between said side surfaces, being adapted to be in an initial sliding contact with said rotary shaft.

2. A sealing device as claimed in claim 1, wherein each of said segments further comprises at least one circumferential groove formed in said sliding surface, said groove having two side walls, one of said side walls being closer to said low pressure side while the other is adjacent to said high pressure side.

3. A sealing device as claimed in claim 1 or 2, wherein said initial sliding contact is substantially a linear contact.

4. A sealing device as claimed in claim 3, wherein said initial sliding contact is presented by an axial portion of said one axial half region adjacent to said one of said opposing surfaces.

5. A sealing device as claimed in claim 4, wherein said sliding surface is inclined radially outwardly from the said one of said opposing surfaces to define, in cooperation with the surface of said rotor shaft, a wedge-shaped space in cross-section which closes at the low-pressure side and opens at the high-pressure side.

6. A sealing device as claimed in claim 5, wherein the angle of inclination of said sliding surface is at least equal to the angle through which said segment is angularly displaced by the fluid pressure at said high pressure side on the segment.

7. A sealing device as claimed in claim 3, wherein said initial sliding contact is presented by an axial portion of said one axial half region, said axial portion being located adjacent to said one side wall of said circumferential groove.

8. A sealing device as claimed in claim 7, wherein the portion of said sliding surface extending between said one side wall of said circumferential groove and said other surface of said opposing surfaces is inclined radially outwardly with respect to the remaining portion of said sliding surface to define, in cooperation with the surface of rotor shaft, a wedge-shaped space in cross-section which closes at the low-pressure side and opens at the high-pressure side.

9. A sealing device as claimed in claim 8, wherein the angle of inclination of said sliding surface is at least equal to the angle through which said segment is angularly displaced by the pressure of the fluid at said high pressure side on the segment.

10. A sealing device as claimed in claim 7, wherein the portion of said sliding surface extending between said one side wall of said circumferential groove and said other surface of said opposing surfaces is retracted radially outwardly with respect to the remaining portion of said sliding surface to define, in cooperation with the surface of said rotor shaft, a generally rectangular cross-sectioned space which closes at the low-pressure side and opens at the high-pressure side.

11. A sealing device as claimed in claim 10, wherein the radial distance between said portion of said sliding surface extending between said one side wall of said circumferential groove and said other surface of said opposing surfaces of said segment and the remaining portion of said sliding surface is at least equal to the length of chord of arc over which the radially inner edge of said the other surface of said opposing surfaces of said segment moves as said segment is angularly displaced by the pressure of the fluid at said high pressure side on the segment.

12. A sealing device as claimed in claim 1, 2, 7, 10 or 11, wherein said solid packing is made of any one of carbon and resin.

13. A sealing device as claimed in claim 1, 2, 7, 10, 11 or 12, wherein said fluid machine is a water wheel of a large capacity and large head.

14. A sealing device as claimed in claim 1, 2, 7, 10, 11, 12 or 13, wherein said segments are spaced circumferentially with a gap defined between adjacent ones, the fluid flowing from said high pressure side to said low pressure side through said gaps to cool said segments.

15. A sealing device as claimed in claim 1, wherein each said segment is unstressed when the pressure on the high pressure side of said fluid machine is equal to the pressure on the low pressure side of said fluid machine prior to operation and in said unstressed condition said segment sealingly engages said rotary shaft with only said portion of said axial half region, and the remainder of said one axial half region and the other of said axial half regions are spaced from said rotary shaft; and when said fluid machine is operating at rated pressure on said high pressure side, the remainder of said one axial half region and the other axial half region of said sliding surface is at a spacing from said rotary shaft that is less than its spacing in said unstressed condition and said portion of said one axial half region being the sole engagement between said segment and said rotary shaft.

16. A sealing device as claimed in claim 15, wherein each of said segments further comprises at least one circumferential groove formed in said sliding surface, said groove having two side walls, one of said side walls being closer to said low pressure side while the other is closer to said high pressure side; said segment further including radially extending passage means opening into said circumferential groove at one end and opening in communication with said high pressure side at its other end for providing high pressure fluid to said sliding surface; and said portion of said one axial half region being located on the low pressure side of said circumferential groove.

* * * * *